United States Patent
Jaeckle

(10) Patent No.: US 11,079,493 B2
(45) Date of Patent: Aug. 3, 2021

(54) DETERMINATION OF INTEGRITY OF INCOMING SATELLITE SIGNALS OF SATELLITE NAVIGATION SYSTEM AND MITIGATION OF UNWANTED SIGNALS

(71) Applicant: Southwest Research Institute, San Anotnio, TX (US)

(72) Inventor: Thomas Howard Jaeckle, San Antonio, TX (US)

(73) Assignees: UHU Technologies, Richardson, TX (US); Southwest Research Institute, San Antonio, TX (US)

( * ) Notice: Subject to any disclaimer, the term of this patent is extended or adjusted under 35 U.S.C. 154(b) by 208 days.

(21) Appl. No.: 16/199,284

(22) Filed: Nov. 26, 2018

(65) Prior Publication Data

US 2019/0101652 A1  Apr. 4, 2019

Related U.S. Application Data

(62) Division of application No. 14/068,218, filed on Oct. 31, 2013, now Pat. No. 10,162,060.

(51) Int. Cl.
*G01S 19/21* (2010.01)
*G01S 19/01* (2010.01)

(52) U.S. Cl.
CPC .......... *G01S 19/215* (2013.01); *G01S 19/015* (2013.01); *G01S 19/21* (2013.01)

(58) Field of Classification Search
CPC ....... G01S 19/215; G01S 19/21; G01S 19/015
(Continued)

(56) References Cited

U.S. PATENT DOCUMENTS 4,498,083 A * 2/1985 Gutleber ............... H01Q 3/2617
                                                    342/380
10,162,060 B2 * 12/2018 Jaeckle .................. G01S 19/215
(Continued)

FOREIGN PATENT DOCUMENTS

EP      2784547 A1 * 10/2014 ........... G01S 19/215

OTHER PUBLICATIONS

Alphones et al, "Null Steering in Phased Arrays by Positional Perturbations: A Genetic Algorithm Approach", @1996, IEEE (Year: 1996).*

(Continued)

*Primary Examiner* — Erin F Heard
*Assistant Examiner* — Thomas M Hammond, III
(74) *Attorney, Agent, or Firm* — Livingston Law Firm

(57) ABSTRACT

A system and method for testing the integrity of signals incoming to a satellite navigation system. The method is implemented with an array of antenna elements, and a receiver connected to each antenna element. The receivers simultaneously and continuously make measurements on all tracked signals. Each receiver measures the carrier phase of an incoming signal. Based on the carrier phase differences between antenna elements and the distance between them, the azimuth and elevation of the signal source can be calculated. This measured angle of arrival can then be compared to an expected angle of arrival to determine if the signal source is legitimate. The system and method can be also applied to determining the angle of arrival of sources of interference, and to mitigating the effects of both illegitimate and interfering signals.

9 Claims, 3 Drawing Sheets

(58) Field of Classification Search
USPC .......................................................... 342/26 B
See application file for complete search history.

(56) References Cited

U.S. PATENT DOCUMENTS

2014/0247186 A1* 9/2014 Daneshmand ........ G01S 19/215
342/357.59
2015/0234053 A1* 8/2015 Psiaki ................... G01S 19/215
342/357.51

OTHER PUBLICATIONS

Nicolaescu et al. "Null Steering Arrays", Telsiks 2001, Sep. 19-21, 2001, @2001, IEEE (Year: 2001).*
Sun et al., "Optimum Transmission of Beamforing On Phase-Only Antenna Arrays", @2002, IEEE (Year: 2003).*
Vo-Huu et al., "Counter-Jamming Using Mixed Mechanical and Software Interference Cancellation", WiSec 13, Apr. 17-19, 2013, @ 2013 (Year: 2013).*

* cited by examiner

DATA FROM RECEIVERS

DETERMINATION OF INTEGRITY OF INCOMING SATELLITE SIGNALS OF SATELLITE NAVIGATION SYSTEM AND MITIGATION OF UNWANTED SIGNALS

TECHNICAL FIELD OF THE INVENTION

This invention relates to satellite navigation systems (SNS's), and more particularly, to detecting when the SNS is being deceived by signals that are "spoofing" the navigation satellite signals and to mitigating those signals.

DIVISIONAL OF PRIOR PATENT APPLICATION

This application is a divisional of U.S. application Ser. No. 14/068,218, filed Oct. 31, 2013, entitled "Determination of Integrity of Incoming Signals of Satellite Navigation System," and bears the benefits of the that filing date.

BACKGROUND OF THE INVENTION

Satellite navigation systems (SNS's) allow electronic receivers to determine their own location (longitude, latitude, and altitude) to within a few meters, using time signals transmitted along a radio line of sight from satellites. The signals also allow the receivers to calculate the current local time to high precision, which allows time synchronization.

A satellite navigation system with global coverage may be termed a global navigation satellite system or GNSS. As of 2013, only the United States NAVSTAR Global Positioning System (GPS) and the Russian GLONASS are operational GNSSs. China is in the process of expanding its regional Beidou navigation system, and the European Union's Galileo system is in progress. Other countries are in the process of developing global or regional navigation systems.

SNS's have three parts: the space segment, the user segment, and the control segment. The space segment consists of a number of satellites, each in its own orbit above the Earth. The user segment consists of receivers, which can be very small and can be either stationary or mobile. The control segment consists of ground stations that measure the satellite orbits and maintain the satellite based time standards.

In operation, SNS satellites each broadcast a signal that contains the orbital parameters of the satellite and the time on board that satellite. The satellite uses a highly stable atomic clock as a master reference for its frequency generation and time keeping. An SNS receiver subtracts the time of broadcast encoded in the transmission from the time of reception, as measured by its internal clock. This difference, when multiplied by the speed of light, provides a range measurement between the satellite and the receiver. The SNS receiver's location and its clock offset from the time reference of the satellite is unknown, but can be calculated from the simultaneous range measurement to at least four satellites. The receiver also receives the orbital ephemeris for the satellites, which allow it to calculate the position of the satellite when the signal was transmitted. Once the positions of the satellites at the time of transmission are known, the location of the receiver and the receiver's clock offset is then calculated.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to a method of verifying the validity of satellite signals of a satellite navigation system. The method detects "spoofing" (bogus) signals. Once a spoofing signal is identified, users can be alerted and measures can be taken to reduce the effect of the spoofing signal. As a byproduct of the method, interference as well as spoofing signals can be identified, and a line of bearing to the signal source calculated. Implementation of the method can be achieved using inexpensive commodity components and printed antennas.

For purposes of example, the following description is in terms of a GPS signal. However, the method is also applicable to other satellite navigation systems and their signals.

The portion of the spectrum used by GPS is, by international agreements, reserved for communications from space to ground. All signals transmitted in this portion of the spectrum are required to be below the ambient noise level. This makes the receivers in this portion of the spectrum vulnerable to interference. By definition, any signal above thermal noise in this frequency band is interference. The manifestation in the receiver of this interference is degraded performance and/or an inoperative receiver.

A more insidious problem than interference is the presence of signals that resemble GPS signals to the extent that a receiver can acquire and track them. It is then difficult to determine if the signals tracked are legitimate or are spoofed copies of legitimate signals.

Figure 1:
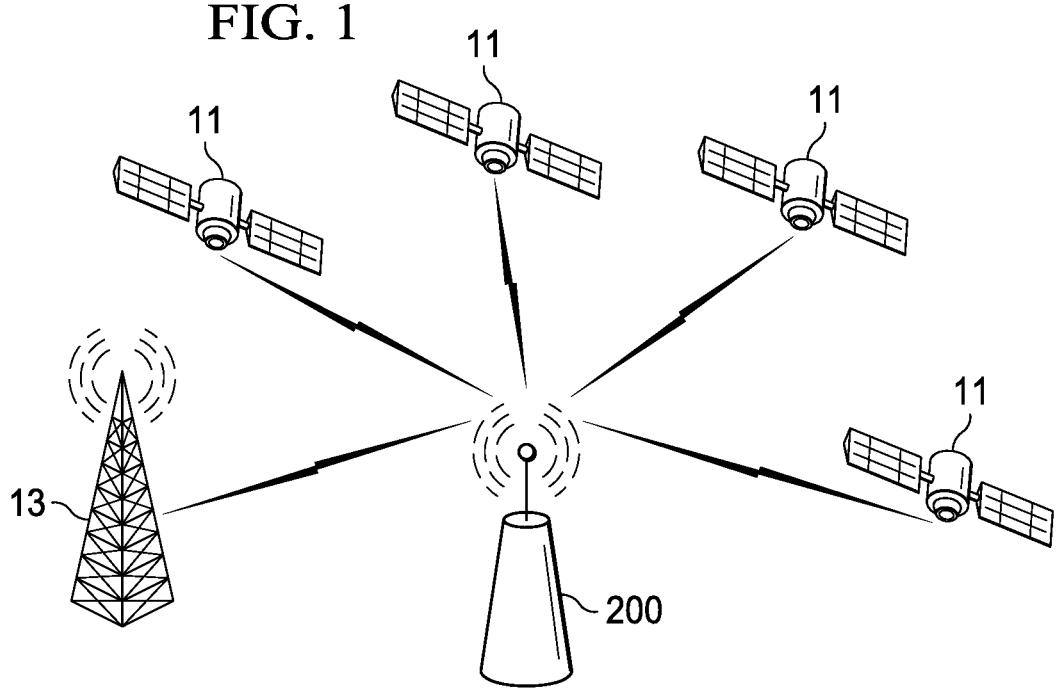
FIG. 1 illustrates a portion of a satellite navigation system and a spoofing signal source.

FIG. 1 illustrates a portion of a satellite navigation system. GPS satellites 11 transmit navigation signals visible to a GPS receiver system 200. Four legitimate GPS satellites 11 are shown; in practice, the receiver system 200 will receive signals from more GPS satellites.

A "spoofer" transmitter 13 is also transmitting signals that simulate GPS signals and are visible to the receiver system 200. Thus, FIG. 1 is an example of the context of the present invention. The "spoofer" transmitter 13 may be implemented with various schemes. For example, the spoofing signal could be a composite of several satellite signals.

Although the spoofer transmitter 13 is shown as a stationary ground station, the method and system herein are not limited to this particular spoofer configuration. For example, the spoofer could be a mobile station, such as an aircraft, with the method and system being modified to compensate for the movement of the spoofer station.

The GPS system has a world-wide network of monitor and control stations (not shown) that continuously update position and clock estimates for each satellite 11. Each satellite 11 is equipped with an accurate clock and broadcasts signals coupled with a precise time message.

As is conventional, the GPS receiver system 200 receives the satellite signal, which takes a measurable amount of time to reach the receiver. The difference between the time the signal is sent and the time it is received, multiplied by the speed of light, enables the GPS receiver to calculate the distance to the satellite. The distance measurement is made in a three dimensional Cartesian coordinate system whose origin is at the center of the earth. Once the distance to the satellites is measured, and the receiver's coordinates in that system are known, they can be converted into latitude, longitude, and altitude. The GPS receiver system 200 is further configured and programmed to perform one or more the methods described herein for detecting spoofing signals, for detecting interference, and for mitigating the effects of either or both.

Detection of Spoofer Signals

Commercial devices, referred to as GPS constellation simulators, generate signals that can be acquired and tracked just as though they were legitimate satellite signals. These devices can be legitimately used in laboratory settings to test different scenarios in GPS receivers for hardware development. Other spoofing devices, including various spoofing repeaters, could also be used for deceiving GPS receivers.

As stated above, the GPS scheme is predicated upon reception of signals within a line of sight of the receiver. A signal can arrive from any azimuthal direction and from elevations from at the horizon to near zenith. The ideal antenna pattern for a GPS receiver is hemispherical, centered on the receiver antenna's zenith. For an antenna with a clear view of the sky, the signals received from a GPS satellite are plane waves arriving perpendicular to the line from the satellite to the receiver.

The GPS spoofer detection method is implemented with a GPS receiver antenna array having multiple antenna elements. Each of these antenna elements is connected to a GPS receiver. Each receiver connected to each antenna element tracks all received signals simultaneously.

Figure 2:
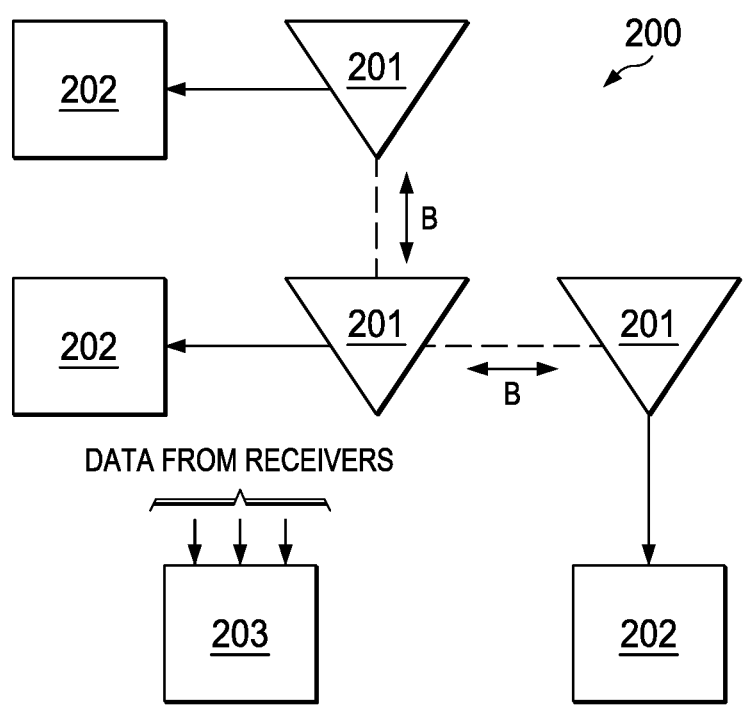
FIG. 2 illustrates a simplified receiver system for implementing the spoofer detection system.

FIG. 2 illustrates one embodiment of a receiver system 200 suitable for implementation of the methods described herein. This embodiment is the receiver system used for the examples provided herein. The receiver system 200 comprises an array of antenna elements 201 and a receiver 202 in communication with antenna element. The antenna elements are arranged along two orthogonal baselines. The orthogonal antenna element baselines share a common antenna element. Along each baseline are at least two or more antenna elements 201.

A processing unit 203 receives data from the receivers 202, and has appropriate software and hardware for performing the method described herein. It should be understood that division of various processing tasks described herein between the receivers 202 and processing unit 203 may be implemented in various ways not significant to the invention. It should be further understood that the receivers 202 may be any device having GPS receiving capability, and whatever hardware and/or software is appropriate to perform the tasks described herein, however divided between the receivers 202 and the processing unit 203.

In the simplified example of this description, there are three antenna element/receiver combinations. The two "end" antenna elements 201 are separated from the common antenna element 201 by a distance B.

Other receiver system embodiments may have a minimum configuration of three antenna elements, arranged so that they allow orthogonal projections of the signal wavefront. Various antenna element geometries that can resolve the projection of the wavefront onto orthogonal baselines would be suitable. A common feature of the various embodiments of receiver system 200 is multiple antenna inputs and all channels making measurements coherently.

Figure 3:
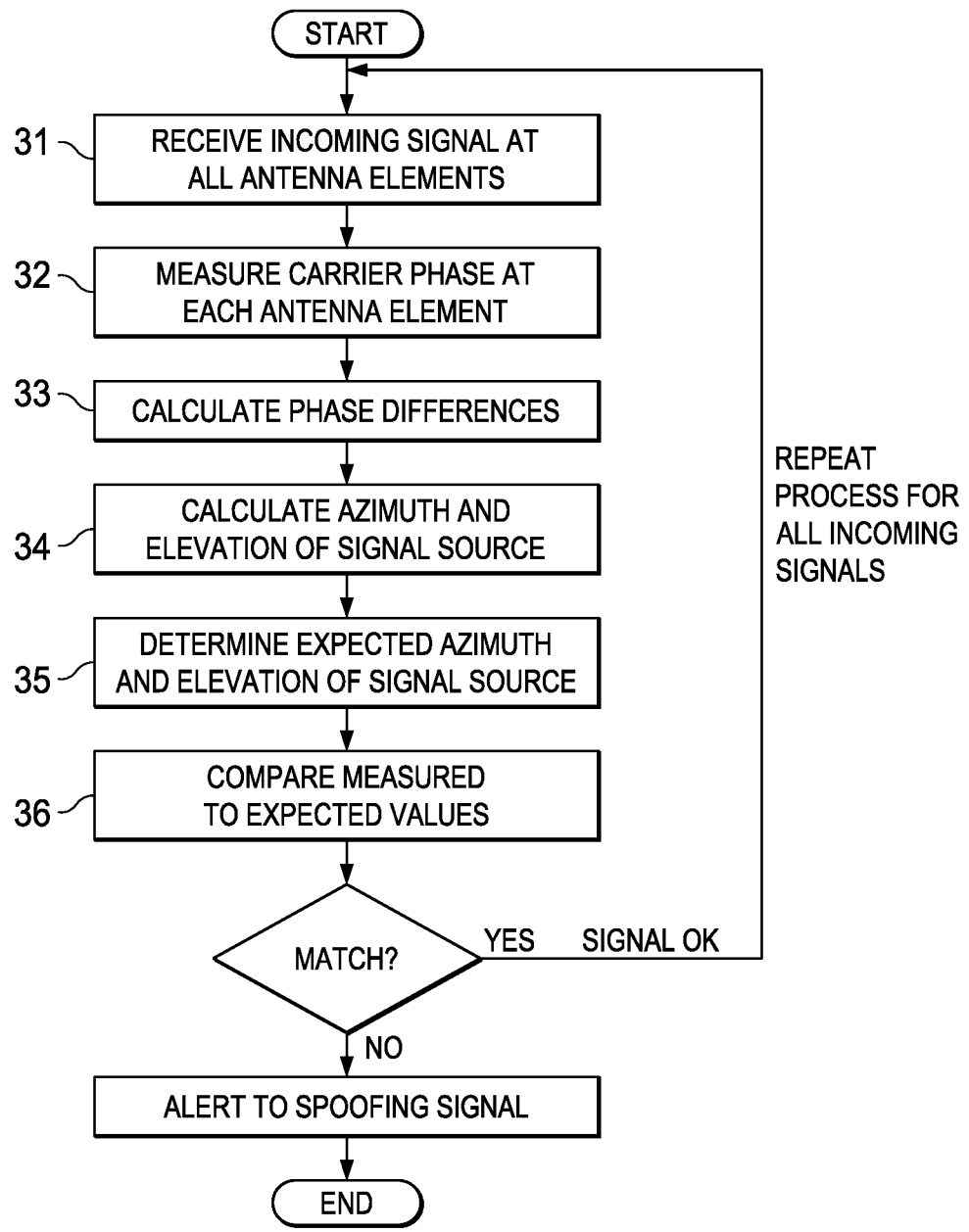
FIG. 3 illustrates a method of detecting a spoofer signal contrived to deceive a satellite navigation system.

FIG. 3 illustrates the operation of the receiver system 200. All receivers 202 make measurements at the same instant. At each antenna element 201 the carrier phase of the incoming signal is measured.

Thus, in Step 31, for a given incoming signal, each antenna element 201 receives that signal. In Step 32, each receiver 202 measures the carrier phase of the signal at its associated antenna element 201. This measurement step includes removing the receiver clock bias and the initial phase ambiguity. In Step 33, the carrier phase differences between antenna elements are calculated. In Step 34, the carrier phase differences and knowledge of the spatial relationship of the antenna elements provides the information required to determine the angle and elevation of arrival of the signals tracked. These steps are described in further detail below.

The result of Steps 32-34 is a "measured" angle of arrival, as compared to an "expected" angle of arrival determined in Step 35.

In Step 35, the expected angle of arrival for each satellite's signal is calculated. Ephemeris information for each satellite is broadcast as part of the navigation message, and is also available to high accuracy from terrestrial sources. This information is used to precisely determine the satellite's location at the time of the reception of the signal from that satellite. Knowledge of the approximate location of receiver system 200 and the satellite's location allows computation of the expected angle of arrival of that satellite's signal.

In Step 36, the expected angle of arrival of each satellite's signal is compared to the measured angle of arrival of the signal tracked. If the comparison results in a match, this provides evidence that the signal is from a legitimate satellite.

The sub-nanosecond differences between the times of arrival of the plane wave fronts across the antenna elements 201 can only be correct if the these wave fronts are originating from the measured direction. Because the direction to the satellite is known, the method described herein detects signals that are not arriving from that direction. A feature of the method is that the measurement used for verification of the signal is a characteristic of electromagnetic plane wave propagation. The measurement has nothing to do with characteristics of the satellite signal.

Determination of Angle of Arrival

As stated above, to determine the angle of arrival of a signal source (satellite or spoofer), each antenna element makes measurements on the same signal. This is accomplished by using a receiver 202 connected to each antenna element 201 that simultaneously (and continuously) makes measurements on all tracked signals. Each of these receivers 202 is synchronized with all other receivers. The result is a composite receiver system 200, which is a massively parallel device with multiple antenna inputs and all channels making measurements coherently.

One approach to determining angle of arrival would be to start with the measured time of arrival at each receiver 202, and to use a conventional GPS distance measurement on the code phase. The code phase chips at a 1.023 MHz rate, so one chip of the code is 292 meters long (speed of light*(1/1.023 MHz)). Measurement can be made to about 0.1% of that distance, so the resolution is 292 meters/1000, or 0.292 meters. The distance measurements and the spatial relationship of the antennas could be used with a geometric algorithm to determine the angle of arrival of the signal source.

However, for purposes of the GPS spoofer detection method described herein, a more precise measurement can be obtained by counting cycles of the carrier wave. The frequency of civilian GPS is 1575420000 Hz. The wavelength of that frequency is 0.19029 meters. Using carrier phase measurements, distance can be measured to fractions of a wavelength. These distance measurements using carrier phase are more accurate, but are for relative distance measurements, not absolute measurements.

The measurement of the angle of arrival based on carrier phase measurements allows for an antenna geometry with antenna elements 201 spaced a practical distance apart. For example, a suitable antenna array might have the antenna elements 201 spaced approximately 20 centimeters apart. The measurement of the angle of arrival of the incident plane wave is accomplished by coherently measuring the signal carrier phase at each antenna element. These carrier phase measurements are biased by fixed constant offsets, which must be removed. If the carrier phase is reported by the receivers 201 at exactly the same time, the difference between these carrier phase measurements will also have a constant but unknown offset, which is the difference between the offsets of the individual biases. However, these biases can be determined because the difference between the observed carrier phases at each antenna element equals the difference in range between the satellite and the receive antennas and the difference between the individual received signal constant biases. A priori knowledge of the distance between the antennas and the orientation of the antennas relative to each other permits calculation of the difference in ranges between these antennas for a signal arriving from any azimuth and elevation up to near zenith.

In other embodiments, the GPS receiver may have other or additional antenna elements that are spaced further apart than a wavelength. This configuration could be used to provide better azimuthal and elevation resolution. Still other embodiments can include non-planar geometries of antenna elements to help resolve angles of arrival from near elevation angles near zenith.

Once the carrier phase differences between antenna elements are known, an angle of arrival calculation can be made. Because the distance between antenna elements is known, an arctangent algorithm may be used to compute the angle of arrival.

Referring again to FIG. 2, to perform the arctangent algorithm, the receiver system 200 has at least three antenna elements 201. In this example, the three antenna elements 201 form orthogonal baselines aligned North-South (NS) and East-West (EW) with a spacing of B meters between the north and the corner and between the east element and the corner, as measured in the plane of the antennas. These antenna elements form a local East-North-Up coordinate system. If the satellite (or other signal source) is in the plane of the antennas and aligned along the NS baseline, the difference between the carrier phase measured between the North antenna and the corner would be B meters. The difference between the carrier phase measured between East antenna and the corner would be 0. Likewise, if the satellite were aligned with the EW baseline, and in the plane of the antennas, the carrier phase difference on the EW baseline would be B and the NS baseline would be 0. With the satellite in the plane of the antennas and assuming any angle, as measured clockwise from the NS baseline, the carrier phase difference measured along these baselines would be:

$$NS=-B*\cos(\text{angle})$$

$$EW=-B*\sin(\text{angle})$$

Measuring the angle moving clockwise relative to a NS baseline is the definition of azimuth. Hence the baseline carrier phase differences, in the plane of the antennas, are:

$$NS=-B*\cos(\text{azimuth})$$

$$EW=-B*\sin(\text{azimuth})$$

In practice, satellite signals are not usable in the plane of the antenna. But when the satellite is at some elevation angle measured between the plane of the antennas moving toward zenith, the signals are useful, but the carrier phase difference measurements are shortened by the cos(elevation). Hence, the general expression for the carrier phase differences along the baselines for a satellite at azimuth, az, and elevation, el, is $$NS=-B*\cos(az)*\cos(el)$$

$$EW=-B*\sin(az)*\cos(el)$$

These are the projections onto the baselines for a signal arriving from an azimuth, az, and an elevation, el.

With the carrier phase measurements and their differences having been determined, i.e., (North-Corner) for the NS and—(East-Corner) for EW, and B is known, the azimuth and elevation for that satellite signal can be calculated. The ratio of the carrier phase difference EW to NS is the tangent of the angle az, or $$az=\arctan(EW/NS),$$

except at + and −90 degrees, where the ratio is undefined.

It should also be noted that there are two possible solutions for the ratio of EW/NS. Depending upon the signs of NS and EW, there is an ambiguity of 180 degrees. However, when measuring the difference in carrier phase between the end antennas elements and the corner, the corner antenna element is used as a reference, so when the satellite is coming from an azimuth between 90 and 270 degrees, the difference will always be negative. The ambiguity is resolved by the sign of the NS quantity and the EW quantity to decide what quadrant and angle to use.

Calculating elevation becomes problematic as the elevation angle approaches 90 degrees. At zenith, there is no difference between the carrier phase measurements between any of the antenna elements. In other words, as the elevation angle approaches 90 degrees, the projection on the baselines becomes shorter and shorter until they become smaller than the measurement resolution and go to zero when the signal arrives from the direction perpendicular to the plane of the antennas. This situation can be resolved by an additional antenna element (and receiver) not in the plane of the other antenna elements.

To determine the elevation angle, the ratio of the projection of the ray to the satellite upon the antenna plane and the baseline spacing is calculated. The baseline spacing, B, is known precisely. So, the elevation angle is given by:

$$\text{elevation angle}=\arccos(\sqrt{((NS)^{\wedge}2+(EW)^{\wedge}2)}/B)$$

Detection of Interference

In addition to measuring the angle of arrival of matched spectral signals, the above-described receiver system has a coherently down-converted IF output. This IF output is digitized, and a discrete Fourier transform can be continuously computed for each antenna element. The frequency bins of the Fourier transform can be used to determine if interference is present.

More specifically, the Fourier transform bins for each antenna element are subtracted from the corresponding bin of the other antenna elements to produce a phase difference for each bin. The difference between the imaginary components of the Fourier transform bins corresponds to the phase difference between each frequency bin. These differences can be used to compute the angle of arrival of the energy in that frequency bin.

If there is no interference in the passband of the GPS receiver, the angle of arrival of the energy within the bins of the Fourier transform coefficients would appear to be random directions. The magnitude of the coefficients would be relatively flat across the passband, and would correspond to the expected value for the noise temperature of the receiving antennas.

If there is interference, analysis of the amplitudes of the bins provides information on the nature of the interference. If the amplitudes of the bins are relatively constant and are well above the expected value for the antenna noise temperature, the interference is likely wideband noise. If the angles of arrival of the energy calculated from the Fourier transform bins are the same, this indicates a wideband jammer in the direction corresponding to the calculated angle arrival.

For interference to be effective at blocking the GPS receiver from operation, it must be significantly more powerful than the GPS signal (greater than by approximately 40 dB). This level of interference is significantly above the antenna temperature and, as such, would be detected by the Automatic Gain Control (AGC) loop of the receiver. The AGC would react to the interference by adding attenuation to the input signal. The value of AGC attenuation is readily available from the receiver and is another indication of RF interference.

Mitigation Solution

As described above, a receiver system comprising an antenna array with multiple antenna elements, each having an associated receiver, can be used to determine the angles of arrival of signals incident upon it. Once the angle of arrival of an unwanted signal (spoofer or interference) is known, it is possible to compute the individual antenna delays which, when summed, reduce the response in that direction. Additionally, if a signal that can be acquired and tracked is determined to not be arriving from the direction expected based upon the known satellite location, it can be excluded from any subsequent navigation solution, thus eliminating its effects.

Figure 4:
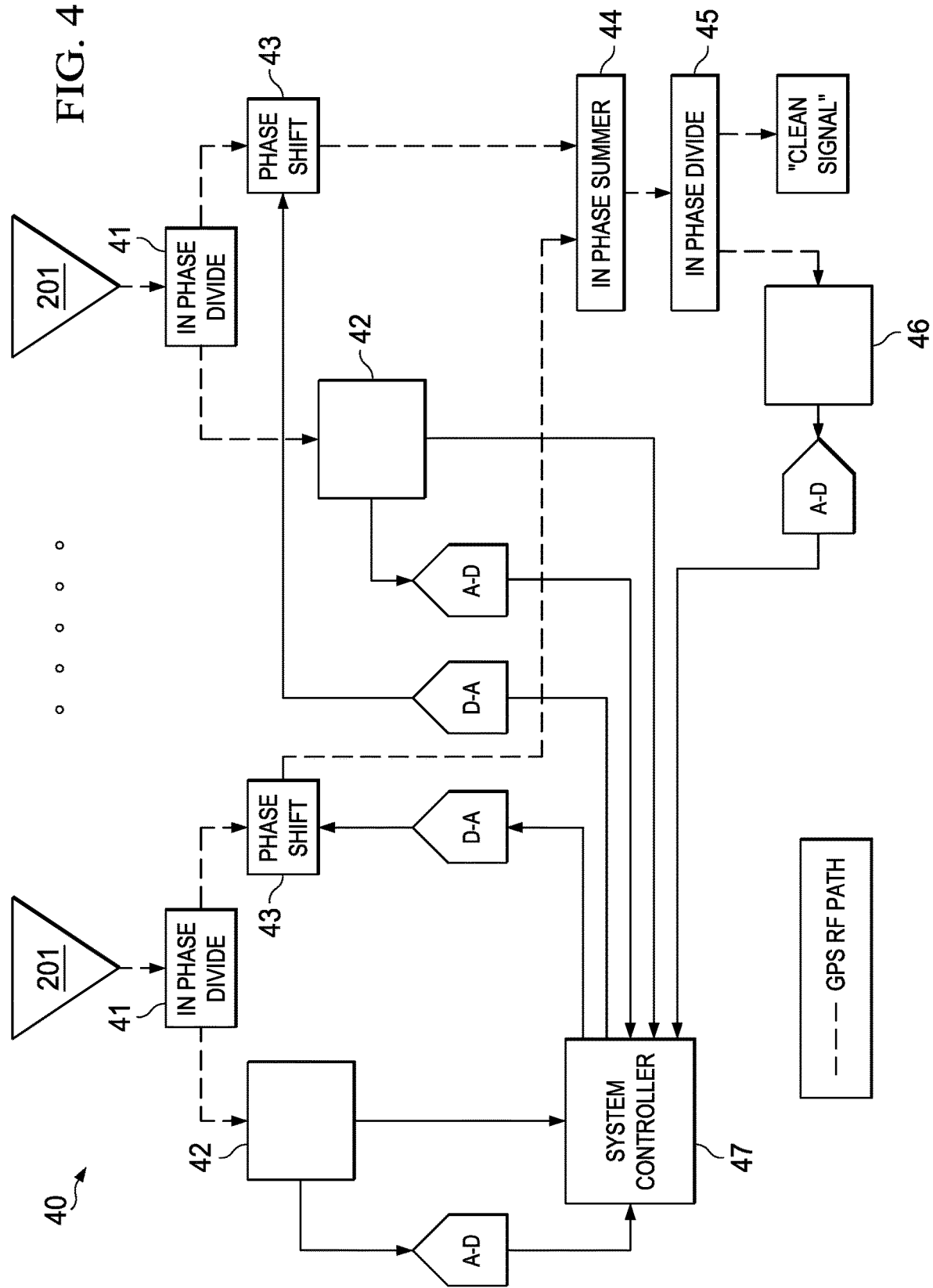
FIG. 4 illustrates an example of a phase shifting unit for mitigating the effects of an illegitimate or interfering signal.

FIG. 4 illustrates a mitigation unit 40, which may be connected to the antenna outputs of receiver system 200. The GPS RF path is illustrated in dashed lines.

The output of each antenna element 201 is power divided with an in-phase divide unit 41, with one output connected to a receiver 42 and the other output connected to an adjustable phase delay 43. All the delayed antenna element outputs can be summed with a summer 44 to create a composite antenna signal. The in-phase summer 44 and receiver 45 are a means of confirming that interference has indeed been removed.

Receivers 42 form the baselines for measuring the angle of arrival of the incident wave front. The system controller 47 decides what delays are needed for each antenna element 201, and applies the input to the phase shifters 43 to implement that delay so that the vector sum of all these delayed signals appears at the output of summer 44. The output of summer 44 is further divided by divider 45 into a "clean signal", which can be applied to another receiver and another local GPS receiver.

Examples of suitable receivers are a SiRF Star IV or a SiRF Star V. An advantage of the latter is that it can also navigate on other GNSS systems. Controller 47 compares the navigation solution obtained from the receivers 42 connected to the individual elements and receiver 46 to verify that the spoofing signal detected by receivers 42 are not the same solution. If spoofing has been detected by the element receivers 42 and the controller has altered the antenna pattern of the phase shifters to cause a null to be directed at that spoofer, then that signal should not be present at the output of divider 45. If it is present, the antenna canceling has not been effective and the signal is not yet "cleaned" and further phase adjustments are needed. If the signal is a spoofing signal, the satellite signal being spoofed can be set "UNHEALTHY" in the receiver connected to the "cleaned signal" output, thus removing it from use by that receiver.

An alternative strategy is to digitize the analog IF output from the element receivers 42 in quadrature. The phase shifts needed to "clean" the signal by forming a null in the direction of the spoofer can be accomplished digitally. Once these phase shifts are applied to the individual down converted IF signals, the vector sum of the signals can be mixed back up to the input frequency and applied to receiver 46 and to the receiver to be protected.

Adjusting the delay of each antenna element will controllably alter the composite antenna pattern. The antenna element delays can be altered to minimize the effects of either interference or matched spectral spoofing signals.

Only the antenna array response in the direction of the interference or spoofer is affected. The antenna array is still able to receive signals that do not arrive from the direction of the interference or threat, thereby mitigating the effects of the threat. The GPS receivers connected to each antenna element continue to track the interference or the illegitimate signals, but the sum of the antenna element delayed signals is greatly reduced in the direction of the interference or the illegitimate signal.

Adjusting the antenna pattern to reduce the response to signals in the direction of an illegitimate signal is similar to, but not the same as, the operation of a controlled radiation pattern antenna (CRPA). A typical CRPA antenna can only work on interference which is sufficiently strong to be measured by the receiver. Once the pattern is adjusted to the point where the measurement falls below the antenna noise temperature, no further interference reduction can be detected. Additionally, the antenna pattern in a typical CRPA antenna is altered without knowledge of where the threats the antenna is intended to address are located with respect to the antenna itself. A typical CRPA antenna can place nulls in directions where no interference or illegitimate signal exists in addition to the desired direction. This is a consequence of the fact that it looks at noise only as a performance indicator. The typical CRPA antenna can neither respond to nor null signals which are below the antenna noise temperature.

SUMMARY

The above-described method determines the legitimacy of signals tracked by a GPS receiver. The method exploits a characteristic of the satellite signals that cannot reasonably be spoofed. The method may be implemented with a single parallel composite receiver system from commodity receiver circuits. This receiver system has multiple RF inputs, which coherently measure the carrier phase of all of the signals the receiver tracks. The carrier phase differences among the antenna elements and the distance between them provides the data necessary to calculate the angle of arrival of the source signal. The legitimacy of the signal is determined by comparing this measured angle of arrival with an expected angle of arrival for satellite signals at a known location.

Once the direction of arrival of an illegitimate signal is known, the composite antenna pattern can be modified to reduce the response in that direction. By properly delaying the individual antenna element responses and summing the resultant phases, antenna pattern nulls can be formed and steered to reduce the effect of the unwanted signal. The summed antenna is responsive in directions other than the direction of the interference or illegitimate signals, thus producing a "cleaned signal".

For cases where a subset of the visible signals are illegitimate, measuring their angle of arrival will identify which of the signals tracked are not from the direction of legitimate GPS satellites. These signals can be set as "unhealthy" within the receiver connected to the summed output, thus causing these signals to be excluded from use in the navigation solution Constructing a receiver with multiple antenna elements connected to receiver channels that all make coherent measurements, permits a coherent digital down conversion to a common IF frequency. Performing a discrete Fourier transform upon these common IF frequencies allow coherent measurements to be made upon the differences between the signals in the GPS passband that are not tracked by the GPS receiver channels. Thus, interference can be detected and its angle of arrival determined. Once this angle of arrival has been determined, this same information can be used to adjust the composite antenna pattern to reduce the antenna response in the direction of the interference, thereby reducing its effects on the receiver.

Continuous monitoring of the sum of the antenna elements, after adjusting the phase of each, can produce a "cleaned signal". This can be confirmed by comparing the navigation solution of a receiver using this "cleaned signal" to that of the individual receivers which are connected to the individual elements. The navigation solution of a receiver connected to the "cleaned signal" can also be compared to the solution obtained from other Global Navigation Satellite Systems (GNSS). If such a receiver is connected to the "cleaned signal", the navigation solution obtained with each different service can be compared to that of GPS. This provides a position confirmation that is independent of GPS satellites.

What is claimed is:

1. A method of mitigating the reception, by a receiver of a satellite navigation system, of an unwanted signal:
   receiving an incoming signal, using a receiver system, wherein the receiver system has an array of antenna elements and a receiver associated with each antenna element;
   determining a measured angle of arrival in both azimuth and elevation of the incoming signal by:
      receiving the carrier phase of the incoming signal by at least three antenna elements of the array;
      calculating carrier phase differences between the at least three elements; and
      based on the carrier phase differences and the distance between the at least three antenna elements, calculating the measured angle of arrival;
   determining an expected angle of arrival in both azimuth and elevation of at least one other satellite signal, based on a satellite location and on the location of the receiver system;
   identifying the incoming signal as the unwanted signal based on a comparison of the measured angle of the arrival and the expected angle of arrival; and
   removing the unwanted signal by steering a null toward the unwanted signal in both azimuth and elevation based on the measured angle of arrival.

2. The method of claim 1, wherein the unwanted signal is a spoofing signal.

3. The method of claim 1, wherein the unwanted signal is an interfering signal.

4. The method of claim 1, wherein the unwanted signal is a spoofing signal, and wherein the angle of arrival of the unwanted signal is determined by comparing the measured angle of arrival to expected angles of arrival from known satellite locations as determined at least in part by ephemeris data.

5. The method of claim 1, wherein the unwanted signal is below the antenna noise temperature.

6. The method of claim 1, wherein the step of calculating a measured angle of arrival of the incoming signal is performed using an arctangent algorithm that projects the incoming signal to the baselines of the at least three antenna elements.

7. The method of claim 1, wherein the step of removing the unwanted signal is performed by determining delays of the at least three antenna elements, which when summed, will reduce the antenna response in the direction of the measured angle of arrival.

8. The method of claim 7, wherein the determining of delays is performed in an analog manner with phase dividers and phase shifters associated with each of the at least three antenna elements and with a controller to determine delays for each antenna element.

9. The method of claim 7, wherein the determining of delays is performed digitally.

* * * * *